United States Patent
Hajalie

(10) Patent No.: US 10,070,622 B2
(45) Date of Patent: Sep. 11, 2018

(54) NATURE SIDE CAT RELAXATION CENTER AND SCRATCHER

(71) Applicant: Mohamed-Mike Hajalie, Dearborn, MI (US)

(72) Inventor: Mohamed-Mike Hajalie, Dearborn, MI (US)

( * ) Notice: Subject to any disclaimer, the term of this patent is extended or adjusted under 35 U.S.C. 154(b) by 174 days.

(21) Appl. No.: 15/264,481

(22) Filed: Sep. 13, 2016

(65) Prior Publication Data

US 2017/0071160 A1 Mar. 16, 2017

Related U.S. Application Data

(60) Provisional application No. 62/218,519, filed on Sep. 14, 2015.

(51) Int. Cl.
*A01K 15/02* (2006.01)
*A01K 1/035* (2006.01)

(52) U.S. Cl.
CPC .......... *A01K 15/024* (2013.01); *A01K 1/0353* (2013.01)

(58) Field of Classification Search
CPC .... A01K 15/02; A01K 13/004; A01K 15/024; A01K 1/0353; A01K 15/027; A01K 1/0107; A01K 1/0157; A01K 29/00

USPC ...... 119/28.5, 471, 526, 621, 706, 707, 708, 119/739; D30/160
See application file for complete search history.

(56) References Cited

U.S. PATENT DOCUMENTS

| | | | | |
|---|---|---|---|---|
| 4,112,873 A | * | 9/1978 | Van Zandt | A01K 15/02 119/706 |
| 4,177,763 A | * | 12/1979 | Cook | A01K 15/024 119/706 |
| D668,006 S | * | 9/2012 | Mulligan | D11/118 |
| 8,695,533 B1 | * | 4/2014 | Mulligan | A01K 1/035 119/28.5 |
| 9,832,975 B2 | * | 12/2017 | Song | A01K 1/035 |
| 2012/0118241 A1 | * | 5/2012 | Smith, II | A01K 1/0107 119/167 |

* cited by examiner

*Primary Examiner* — Sarah B McPartlin

(57) ABSTRACT

A cat face scratcher and relaxation center. The invention is used for by a pet or cat to scratch their face and claws independently while utilizing an area on the product to relax. The present invention consists of two poles, each in a vertical position that will be attached and secured on a base. The base will also serve as a relaxation lounge area where it will have an appearance of a natural garden and lawn that is attached. The poles will have attached to them the main component which is the face scratcher. There will be multiple face scratchers attached to the poles ranging from top to bottom giving different levels of scratching. To add to the nature feeling of the product, leaves and vines will be wrapped around the poles and also serve as an additional scratcher.

12 Claims, 5 Drawing Sheets

NATURE SIDE CAT RELAXATION CENTER AND SCRATCHER

RELATED APPLICATION

The present application depends from and claims priority to U.S. provisional application No. U.S. 62/218,519 filed Sep. 14, 2015, the entire content of which are incorporated herein by reference.

BACKGROUND OF THE INVENTION

Field of the Invention

This invention relates to the field of pet products. More specifically, the invention comprises a cat scratcher and relaxation lounge area that allows the animal to scratch their face and claws independently while relaxing and lounging.

Description of Related Art

Pet products are incredibly popular with people that have pets and finding the right one that fits the needs of pet owners is hard. Cats are domesticated animals that have a nature side to them. They are playful, instinctual, and they want to explore their surroundings. Finding a product that incorporates the qualities of nature where the cat can explore, relax and scratch is hard to do. Cats specifically like to be scratched where they have scent glands and like the feelings they get from it. The cat's face, specifically where the whiskers are located is one of the many spots cats like to be messaged. There are some products that are available for cats to use where they can scratch their face and only their face. One of these include a body scratcher for cats that is shaped like an arch, this scratcher does not offer multiple levels and does not provide a lounge area. Another product is a scratcher that attaches to a fixed location using adhesive tape. Though this is one way of scratching it has its drawbacks. That product is fixed to one location using adhesive tape and cannot be moved around. That product is plain and does not provide any other needs. Both of these products mentioned above do not offer multiple levels of scratching and do not have a relaxation lounge area.

My present invention seeks to improve on the prior art with a simple but unique way of scratching/messaging a cat's face. My invention will have multiple levels at different heights for cats to scratch their face. My invention is portable and can be moved around. My invention has a base which attaches to poles where the poles hold the scratching mechanism. The base will provide a flat surface where there will be cat friendly material attached on the flat surface to serve as a relaxation lounge center for the cat. The cat friendly material attached on the flat surface is not limited to one type of material and can include different textures or attachment. The surface material that is attached to the base can be formed of carpet, grass, artificial grass, soft non-abrasive fibers, yarn, synthetic lawn, turf, carpet fibers, carpet grass, polypropylene, sisal, and or corrugated cardboard. These surface material attached to the base will be used by the cat to relax, lounge, or scratch on.

DETAILED SUMMARY OF THE INVENTION

The present invention comprises a product for cats that will be used for relaxation and scratching. The invention is used by a cat to scratch their face and claws independently while utilizing an area on the product to relax and lounge. The invention is configured to be used anywhere and can be moved around. The invention will have a plurality of poles connected to the base where the poles will contain the face scratcher. Preferably, the invention will consist of two poles each in a vertical position containing the face scratcher. The material of the pole is durable and cannot easily be broken, for example such material would be wood, plastic, rubber, wood chips, artificial wood, and or wood grain. The poles are attached to a base using fasteners which will secure the poles in place.

The materials being used as the face scratcher for the cat will be attached in a horizontal position to the two poles from one end to the other end. Although the current invention has the face scratcher material attached in a horizontal position, changing this position in the future (for example in a vertical position) will not alter the function of the invention. The invention will have multiple scratching materials attached to the poles ranging from top to bottom giving different level of scratching. The material being used is flexible and durable; it will give a great feeling to the cat or pet's face. The material used as the face scratcher optionally can consist of a variety of material that cats can use to scratch, some of these materials can optionally consist of fiber materials, natural fiber materials, yarn, wood, plastic, sisal, bristles, brush, pipe cleaners, comb, and so on, all which could be used for grooming. The preferred material used as the face scratcher is bristles and brushes. The material that serve as the face scratcher will not be limited to one type of material. Changing the scratching material will not alter the function of the invention. Any scratching material that will be used will still serve the scope of the invention and will still be attached to the poles as a groomer.

The base that holds the poles will also be used by the cat as a relaxation lounge center and scratcher. The base will provide the ability to use a surface that can be of various surface materials that is attached to the base and said surface material will be used as a relaxation lounge area. It is an object of the invention to provide a cat relaxation lounge center and scratcher on the base of the product that can use various surface materials for a cat to lounge such as carpet, grass, artificial grass, soft non-abrasive fibers, yarn, synthetic lawn, turf, carpet fibers, carpet grass, polypropylene, as well as all current scratching materials such as sisal, carpet material, and corrugated cardboard. The present invention will have material that has the appearance and feel of a natural garden and lawn that is attached on the base that will serve as a relaxation lounge center and give a nature feeling to the cat. The invention is not limited to this and can have different surface material attached to the base as options mentioned above. Using different materials that will be attached to the base will not alter the function of the base. The base will still serve its purpose to secure the poles and have attached to it the surface material. The surface material will serve as the relaxation lounge center. For example, having carpet material or corrugated cardboard as the surface material attached on the base to serve as the relaxation lounge center will not change the function of the invention.

Optionally, the invention can provide a surface that is interchangeable so as the surface material can be replaced when needing or wanting to. For example, if the base has plastic grass attached to the base it can be switched for corrugated cardboard.

Preferably, my invention will provide leaves and vines that attach around the pole to give a nature feeling to the product. This feature will not change the function of the poles and can be removed without altering the invention. It is there to add appearance of a natural environment. Additionally and optionally a ball can be attached to the product to also make it a play area.

REFERENCE NUMERALS IN THE DRAWINGS

Figure 1:
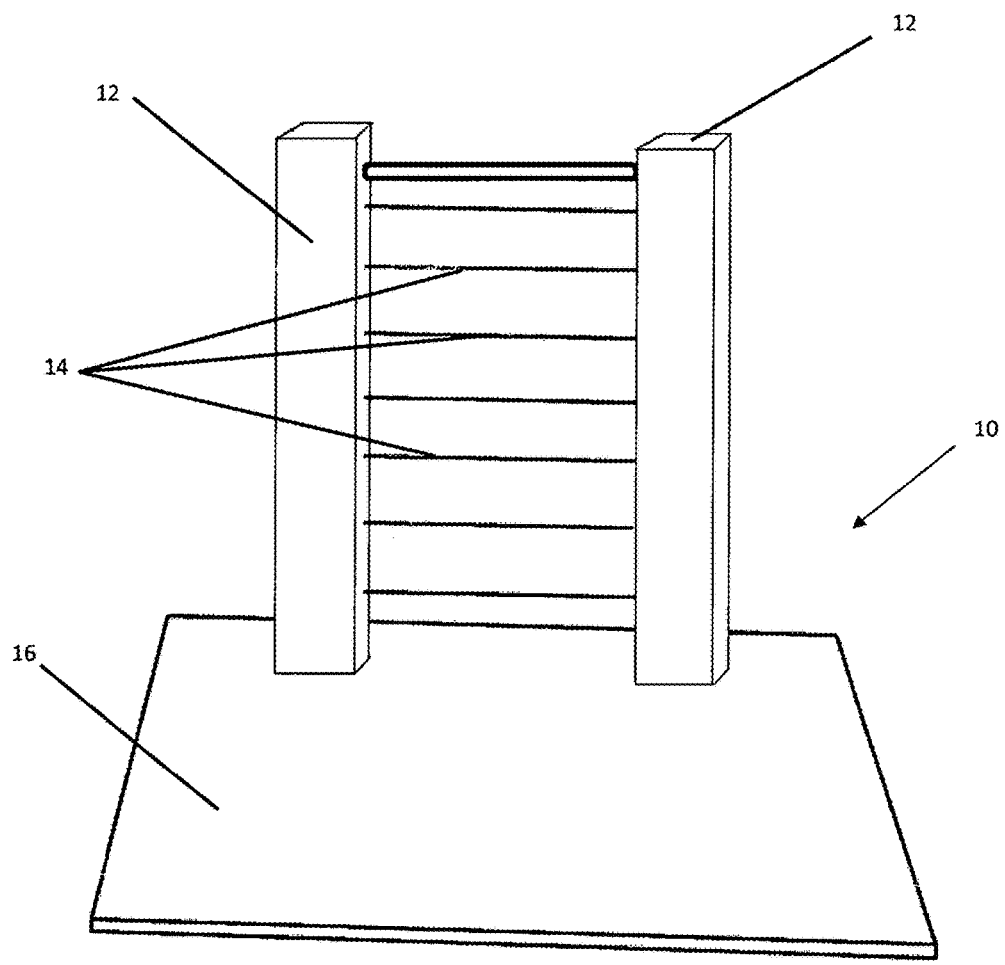
FIG. 1 is a perspective view, showing the present invention in its raw form.

| | Reference numerals in the drawings | | |
|---|---|---|---|
| 10 | Pet Scratcher and relaxation center | 20 | Base Fastener |
| 12 | Pole | 22 | Leaves |
| 14 | Face Scratcher Material | 24 | Vines |
| 16 | Base | 26 | Natural Garden Lawn |
| 18 | Pole Fastener | 28 | Surface Material |

DETAILED DESCRIPTION OF THE INVENTION

FIG. 1 shows a perspective view of the present invention in a raw assembled state. Pet scratcher and relaxation center 10 contains base 16 and poles 12, which contains various components. Poles 12 are attached to base 16; there are two poles 12 attached to base 16. The base 16 will also be used to provide a surface for optional features to be attached and secured on it. Face scratcher 14 is attached to poles 12. Face scratcher 14 will be used as a face scratcher for the pet. Face scratcher 14 will use a flexible durable material. FIG. 1 shows the raw assembled state of the invention without any other features attached on it except the face scratcher 14. FIG. 1 shows what the invention will look like if you strip off the materials attached on the product except the face scratcher 14. The outcome of the invention will look like FIG. 3 showing the materials and features attached on it.

Figure 2:
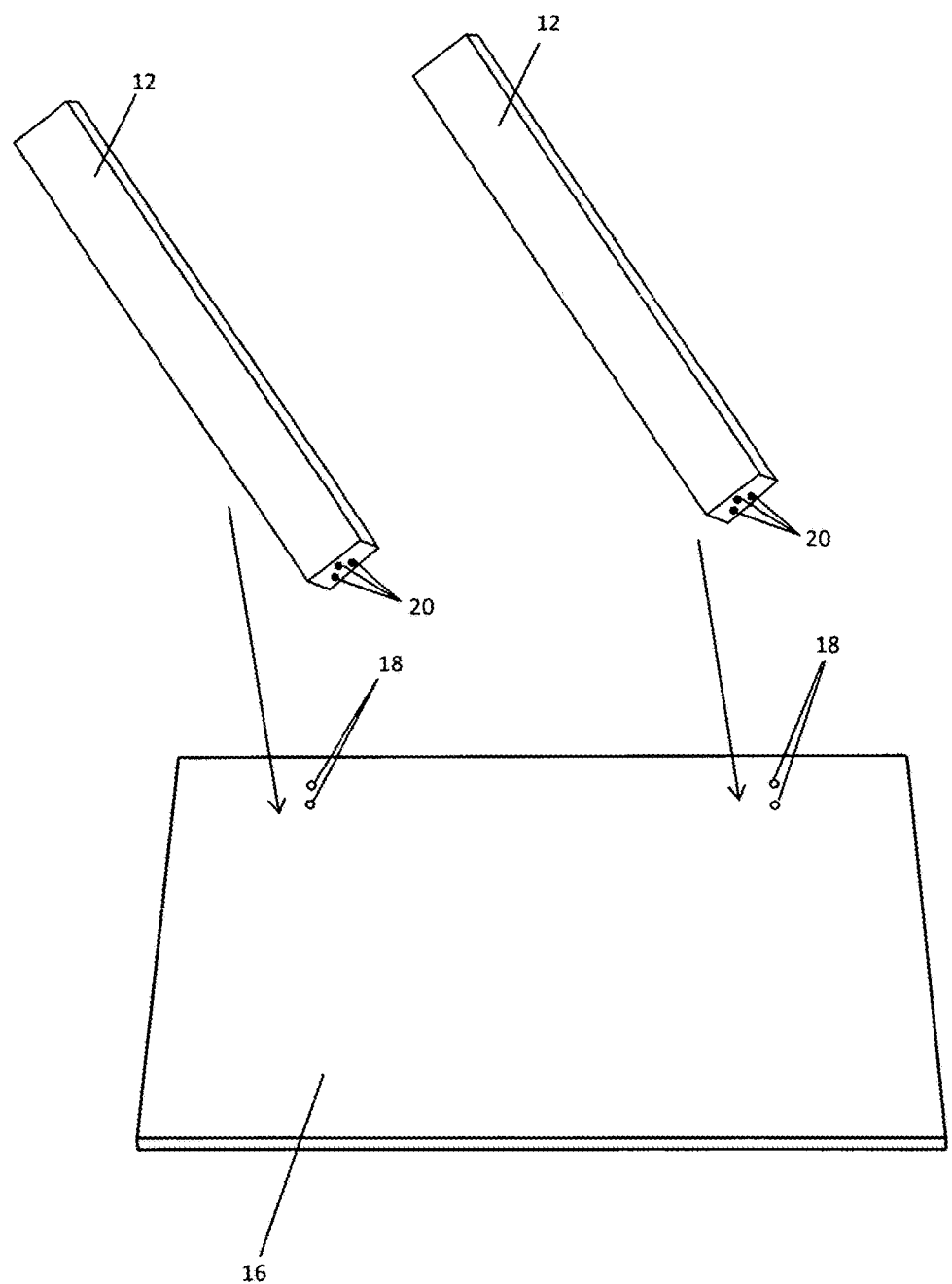
FIG. 2 is an exploded view, showing some details of the invention.

The present invention will include installation features allowing it to be readily installed. FIG. 2 shows one example of such installation features, bear in mind that many other possibilities exist to install product, doing so will not change the scope of the invention. FIG. 2 is an exploded view showing some detail of the invention and installation. Pole 12 is attached to base 16 using fasteners. The bottom of pole 12 shows base fasteners 20 that will be attached to pole fasteners 18 on the base 16. The specific example shown uses fasteners as attachments.

Figure 3:
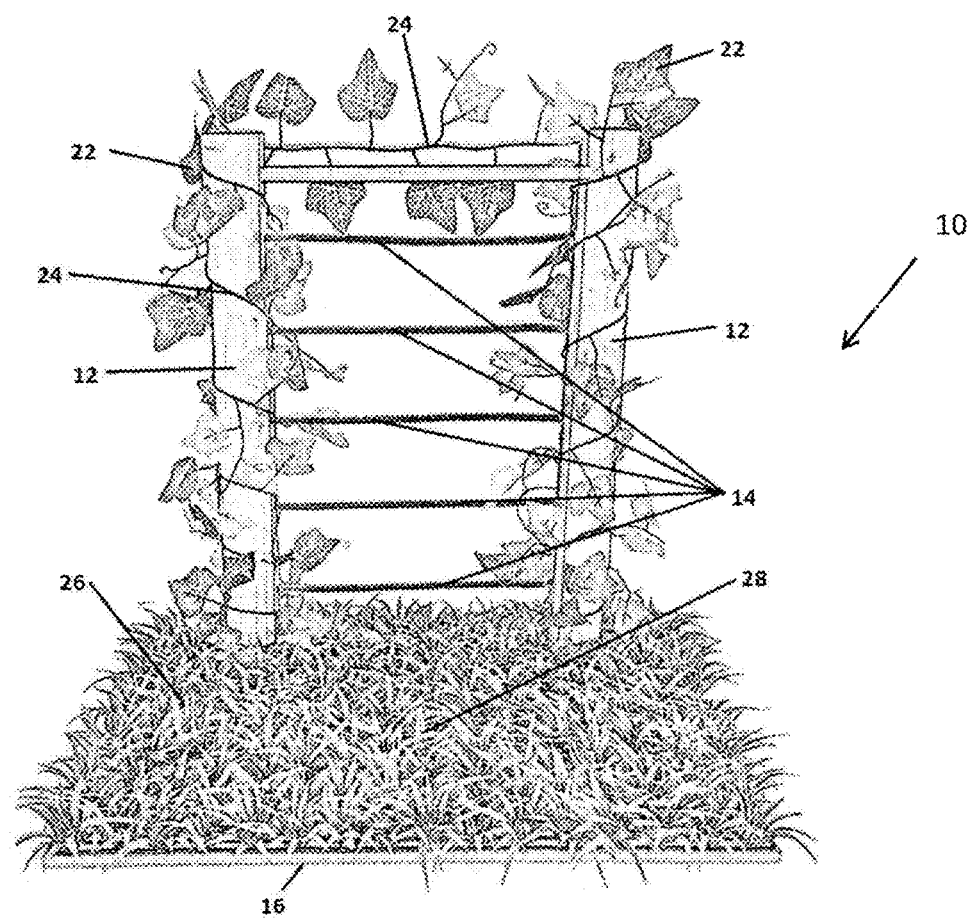
FIG. 3 is a perspective view, showing the present invention.

FIG. 3 is a perspective view, showing the present invention with the components attached. In FIG. 3 pet scratcher and relaxation center 10 includes poles 12 attached to base 16 which contains several components. The components shown are leaves 22 and vines 24 attached around poles 12, natural garden lawn 26 attached to base 16, surface material 28 in this example has an appearance of natural garden lawn 26 attached to base 16, face scratcher 14 attached to poles 12. Face scratcher 14 will use material that is flexible to the cat's movement and is durable, face scratcher 14 is not limited to one kind of material and will use whatever approach is appropriate to solve the purpose of scratching the pet's face. The preferred material used as the face scratcher is bristles and brushes. Optionally, the material used as the face scratcher can consist of a variety of material that cats can use to scratch, some of these materials can optionally consist of fiber materials, natural fiber materials, yarn, wood, plastic, sisal, bristles, brush, pipe cleaners, comb, and so on all which could be used for grooming. The material that serve as the face scratcher will not be limited to one type of material. Changing the scratching material will not alter the function of the invention.

Base 16 will hold the poles 12 and have a means for providing a surface suitable for a cat to use as a relaxation lounge area and can be used with different surface material 28 which will be attached to base 16. Surface material 28 is not limited to one type of material and will use material that will provide the purpose of relaxing, scratching, and lounging. Surface material 28 can be formed of carpet, grass, artificial grass, soft non-abrasive fibers, yarn, synthetic lawn, turf, carpet fibers, carpet grass, plastic grass, polypropylene, as well as all current scratching materials such as sisal, carpet material, and corrugated cardboard. The present invention will have surface material 28 that has an appearance and feel of a natural garden lawn 26 that is attached on the base 16 that will serve as a relaxation lounge center and give a nature feeling to the cat. The invention is not limited to this and can have different surface material attached to the base as options mentioned above. Using different surface materials 28 that will be attached to the base 16 will not alter the function of the base. A couple examples of the various surface material 28 attached to base 16 is; base 16 can have surface material 28 formed of plastic grass attached to base 16, it can have surface material 28 formed of carpet material attached to base 16, it can have surface material 28 formed of corrugated cardboard attached to base 16, and so on. As mentioned above, the present invention will currently have an appearance of a natural garden lawn 26 attached to base 16 and can also serves as a scratcher to the pet. The natural garden lawn 26 gives a good feeling to the pet's face and body when they scratch along the surface and relax on it. It is an important feature since it serves as a scratcher and lounge area which makes the invention look natural. Pets prefer to have a natural feeling when they use products and this invention will solve that issue. It combines two in one, scratching and nature while relaxing. This attachment makes the pet feel like they are outside and entices them to come and explore the product. It is important to have an appearance of a natural garden lawn 26 because during the winter cats can relax on it and it brings out their natural instincts. In the future I can optionally create several versions each having different surface material 28 as stated above to be attached to the base 16. Additionally, I can optionally have interchangeable surface material that is attached to the base 16 that can be replaced without replacing the total unit. The future versions will not change the function of the present invention. The product will still serve its purpose as indicated above.

The invention will have a plurality of poles connected to the base where the poles will contain the face scratcher 14. Preferably, the invention will consist of two poles 12 each in a vertical position containing the face scratcher 14. Optionally, the poles 12 are not limited to a vertical position and can have a plurality of positions while holding the face scratcher 14. The material of the poles 12 is durable and cannot easily be broken, for example such material would be wood, plastic, rubber, wood chips, artificial wood, and or wood grain. Optionally the poles 12 can also have material wrapped around it such as sisal, carpet material, fabric, and so on while holding the face scratcher 14 and secured to base 16.

FIG. 3 also shows leaves 22 and vines 24 attached to poles 12 which brings the product to life. These features bring out the cat's natural instinct when using this product and can also be used to scratch their face and body as they glide on it. Leaves 22 and vines 24 make the product look natural like a garden.

Figure 4:
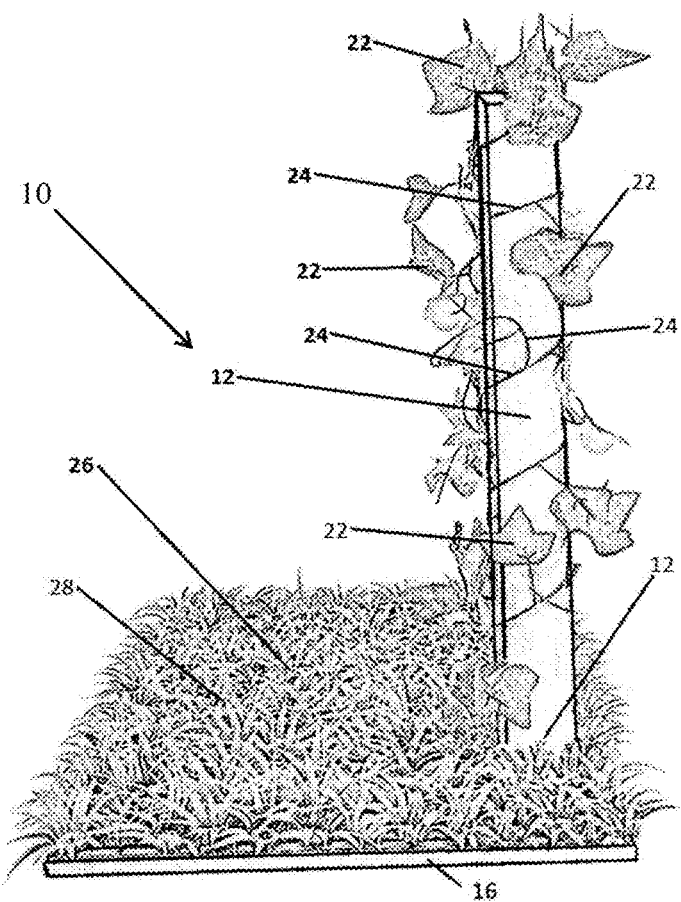
FIG. 4 is a perspective view, showing the side of the present invention.
Figure 5:
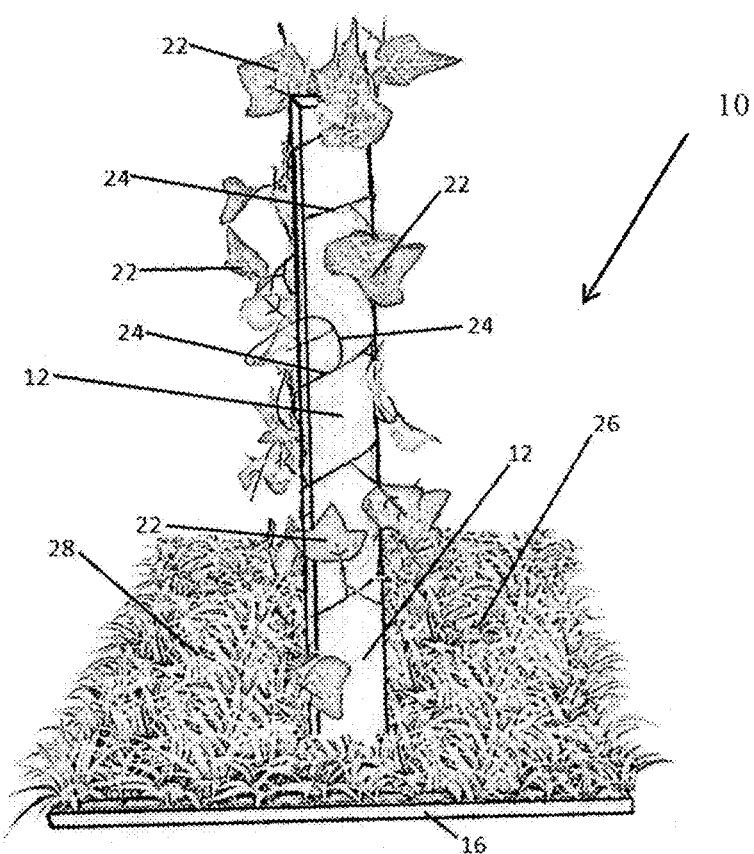
FIG. 5 is a perspective view, showing an alternative embodiment side view of the poles position moved to the middle of the base.

FIG. 4 is a perspective view, showing the side of the present invention. This view shows what the invention will look like from the side. As you see poles 12 are attached to base 16, as well as the other components. Leaves 22 and vines 24 are attached to poles 12 and natural garden lawn 26 and surface material 28 is attached to base 16. Also, face scratcher 14 is attached to poles 12. The purpose of FIG. 4 is to show how the poles 12 are positioned in the current invention. The poles 12 are positioned towards the back of the base 16. This allows the pet to have more space to relax and lounge. Turning to FIG. 5 the reader will see an example of the alternative position of the poles 12.

FIG. 5 shows an alternate embodiment in which the poles 12 are moved to the middle of base 16. Although this move will not affect the invention's function at all, the reader will see an alternative of what it would look like if the poles 12 are moved to the middle of the base 16. FIG. 5 still has the same function as before; poles 12 are attached to base 16, as well as the other components. Leaves 22 and vines 24 are attached to poles 12 and natural garden lawn 26 and surface material 28 is attached to base 16. Also, face scratcher 14 is attached to poles 12. As the reader can see in FIG. 5 there are two sides where the pet can sit or relax on the surface, the front of poles 12 or the back of poles 12. The intention of FIG. 5 is to show an alternate embodiment of how poles 12 are positioned on the base 16. It should be noted that the position of the poles 12 should not limited to their position. Changing the position of poles 12 forward, backward or in any direction will not impact the scope of the invention, the present invention will still serve the same function.

Though the following description contains significant detail, it should not be construed as limiting the scope of the invention but rather as providing illustrations and claims of to what the scope and function of the present invention will serve. It is not intended that the following descriptions in anyway limit the scope to any such embodiments and applications. Substitutions, changes and variations in the described embodiments, applications, and details of the methods and system illustrated herein can be made by me the inventor without departing from the spirit of the invention. For example, the attachments to base 16 illustrations could take many different forms. Some of the alternative as already mentioned could be carpet, corrugated cardboard, or as shown an appearance of a natural garden lawn 26. Another example, the poles 12 illustrated could take many different forms; it can be formed of wood, rubber, plastic, wood particles, wood chips, artificial wood, and so on. Another example, toys can be added to the invention such as a ball for the pet to play with. Adding such features such as a ball should not alter the purpose of the invention. These are just examples and such a variation would not materially alter the nature of the invention.

What is claimed is:

1. A cat face scratcher and relaxation lounge area for pets comprising:
a flat base;
a plurality of poles extending vertically from said base with each of said poles being attached to said base with a plurality of fasteners;
at least two elongated elements attached to and extending between two of said plurality of poles such that said elements are at different heights relative to each other above said base;
each of said elongated elements comprising a face scratcher material; and
a surface material removably attached to said base and providing the appearance of a natural lawn, wherein said base is configured to accept various surface materials.

2. The cat face scratcher and relaxation lounge area of claim 1 wherein said poles have leaves and vines wrapped around them to mimic nature.

3. The cat face scratcher and relaxation lounge area of claim 1 further comprising multiple levels of flexible and durable face scratcher material attached to each of said poles at different heights relative to each other above said base, wherein the face scratcher material attached to each of said poles comprises fiber materials, natural fiber materials, yarn, wood, plastic, sisal, bristles, brush, pipe cleaners, or comb.

4. The cat face scratcher and relaxation lounge area of claim 1 wherein said poles are formed of rubber.

5. The cat face scratcher and relaxation lounge area of claim 1 wherein said poles are formed of plastic.

6. The cat face scratcher and relaxation lounge area of claim 1 wherein said poles are formed of wood.

7. The cat face scratcher and relaxation lounge area of claim 1 wherein said poles are formed of wood particles.

8. The cat face scratcher and relaxation lounge area of claim 1 wherein said poles are formed of wood chips.

9. The cat face scratcher and relaxation lounge area of claim 1 wherein said poles are formed of artificial wood.

10. The cat face scratcher and relaxation lounge area of claim 1 further comprising material wrapped around each of said poles, wherein said material wrapped around each of said poles comprises sisal, carpet material, or fabric.

11. The cat face scratcher and relaxation lounge area of claim 1 wherein said surface material removably attached to said base comprises natural garden lawn, plastic, corrugated cardboard, carpet, sisal, grass, artificial grass, soft non-abrasive fibers, polypropylene, plastic grass, yarn, synthetic lawn, turf, carpet fibers, or carpet grass.

12. A cat face scratcher and relaxation lounge area for pets comprising:
a flat base;
a plurality of poles extending vertically from said base with each of said poles being attached to said base with a plurality of fasteners, wherein said poles comprise wood, artificial wood, plastic, rubber, wood chips, or wood particles;
at least two elongated elements attached to and extending between two of said plurality of poles such that said elements are at different heights relative to each other above said base;
each of said elongated elements comprising a face scratcher material, wherein the face scratcher material comprises fiber materials, natural fiber materials, yarn, wood, plastic, sisal, bristles, brush, pipe cleaners, or comb;
a surface material removably attached to said base and providing the appearance of a natural lawn, wherein said surface material comprises plastic, carpet, grass, artificial grass, soft non-abrasive fibers, polypropylene, plastic grass, yarn, synthetic lawn, turf, carpet fibers, carpet grass, corrugated cardboard, or sisal; and
artificial leaves and vines wrapped around each of said poles.

\* \* \* \* \*